United States Patent [19]

Biermann

[11] Patent Number: 4,755,342
[45] Date of Patent: Jul. 5, 1988

[54] INTERNAL BLOW MOLDING PROCESS

[76] Inventor: Paul J. Biermann, 14605-116 Ave., Edmonton, Alberta T5M 3E8, Canada

[21] Appl. No.: 896,398

[22] Filed: Aug. 13, 1986

Related U.S. Application Data

[63] Continuation of Ser. No. 590,756, Mar. 19, 1984, abandoned.

[30] Foreign Application Priority Data

Mar. 13, 1984 [CA] Canada .................................. 449483

[51] Int. Cl.$^4$ ..................... B29C 49/54; B29D 1/00; B65D 1/02
[52] U.S. Cl. ..................................... 264/523; 215/31; 249/59; 425/525
[58] Field of Search ............... 264/523, 540, 541, 542, 264/543; 425/522, 525; 249/59; 215/31, 356, 357

[56] References Cited

U.S. PATENT DOCUMENTS

| 2,315,478 | 3/1943 | Parkhurst | 264/523 X |
| 3,198,375 | 8/1965 | Hunter | 264/540 X |
| 3,371,376 | 3/1968 | Fischer et al. | 264/540 X |
| 3,769,394 | 10/1973 | Latreille | 264/525 X |

FOREIGN PATENT DOCUMENTS 75014 11/1918 Austria ................................. 249/59

Primary Examiner—Jan H. Silbaugh
Assistant Examiner—Karen D. Kutach
Attorney, Agent, or Firm—Kenyon & Kenyon

[57] ABSTRACT

A method for producing in a cylindrical thermoplastic material an internal thread by blow molding the thermoplastic material in a mold in which the surface of the mold defining the outer face of the thread is at a negative angle of at least 5 degrees to the planes perpendicular to the axis of the cylindrical material.

4 Claims, 1 Drawing Sheet

INTERNAL BLOW MOLDING PROCESS

This is a continuation of application Ser. No. 590,756 filed Mar. 19, 1984, now abandoned.

This application relates to blow molding of thermoplastic materials.

BACKGROUND OF THE INVENTION

Over a considerable number of years a large number of consumer products are reaching the marketplace in blow molded thermoplastic containers. Typical examples include windshield washer antifreeze and cooling system antifreeze for motor vehicles. While these are commonplace examples, the overall range of products contained in these containers is great and has been continuously increasing for a number of years. Simplicity of manufacture, durability and economy are factors which have influenced the growth in this industry.

While these blow molded containers have offered substantial advantages in many ways, there have been a number of long-felt problems for which adequate solutions have not been available. One such problem has been the difficulty in pouring from larger thermoplastic containers into receptacles having a relatively small opening. For example, in the case of the windshield washer antifreeze for motor vehicles, such products are commonly bought and transferred at motor vehicle service stations into the container provided for the purpose in the motor vehicle. Generally, funnels or the like are not readily available. As a result, there is considerable spillage with its many attendant undesirable results. In seeking a solution to this specific problem, a broader general problem in the blow molding art arose. This was the inability to blow mold an internal thread.

The present invention provides a method for blow molding an internal thread in a thermoplastic material. Such a thread has many uses, a specific example of one of which is on a pouring spout which can be attached directly to the external thread at the container opening.

PRIOR ART

It has been the case that screw caps and the like commonly used on molded thermoplastic containers have themselves been injection molded. Since it is impractical to injection mold a pouring spout with adequate mechanical properties, namely, with the flexing properties necessary to permit a non-directionally oriented spout to be bent in the pouring direction, and since the only internally threaded components were injection molded, a one piece pouring spout could not be blow molded for attachment to the container. As a result, it has commonly been the practice to utilize a two piece combination of a spout and an injection molded cap to form a pouring device. Thus, a spout would be constructed with a flanged bottom and an injection molded cap would be constructed with an opening in the top to accommodate the spout and with sufficient material remaining around the opening in the top to form a corresponding flange. The spout would then be inserted upwardly through the cap with the top of the spout flange bringing up against the inside of the top of the cap. The cap would then be tightened onto the threaded opening of the container to seal the parts together and provide for pouring from the container.

This arrangement included a number of problems. For example, in use the spout section of the arrangement has normally been of a formed directional nature, so that that section would require to be properly oriented when the cap was tightened in place. From the manufacturing point of view, the necessity for two pieces produced by different processes is a very inefficient approach and thus economically unattractive.

Similar problems arise in other applications by reason of the absence of an internal thread.

The present invention overcomes this difficulty by the provision of a method and apparatus for blow molding an internal thread whereby a variety of useful components can be readily produced for attachment to blow molded containers having an external thread. In terms of the specific application to a pouring spout, such a spout is produced which can be attached directly to the external thread of the container to produce a well-sealed pouring apparatus.

SUMMARY OF THE INVENTION

It has been discovered that a proper selection of the angle forming the surfaces of the mold will permit the blow molding of an internal thread which provides adequate sealing and gripping power for general use. In particular, negative angles are provided in that surface of the mold that defines the outer face of the internal thread.

Thus, there is provided a method for producing in a cylindrical thermoplastic material an internal thread comprising blow molding the thermoplastic material into a mold in which the surface of the mold defining the outer face of the thread is at a negative angle of at least 5 degrees to the planes perpendicular to the axis of the cylindrical material.

In a further embodiment there is provided a method of constructing in a cylindrical thermoplastic material an internal thread comprising constructing a mold in which the surface of the mold defining the outer face of the thread is at a negative angle of at least 5 degrees to the planes perpendicular to the axis of the cylindrical material and blow molding the thermoplastic material into the mold.

There is further provided a blow molded thermoplastic product having an internal thread.

BRIEF DESCRIPTION OF THE DRAWINGS

In drawings which illustrate embodiments of the invention.

Figure 1:
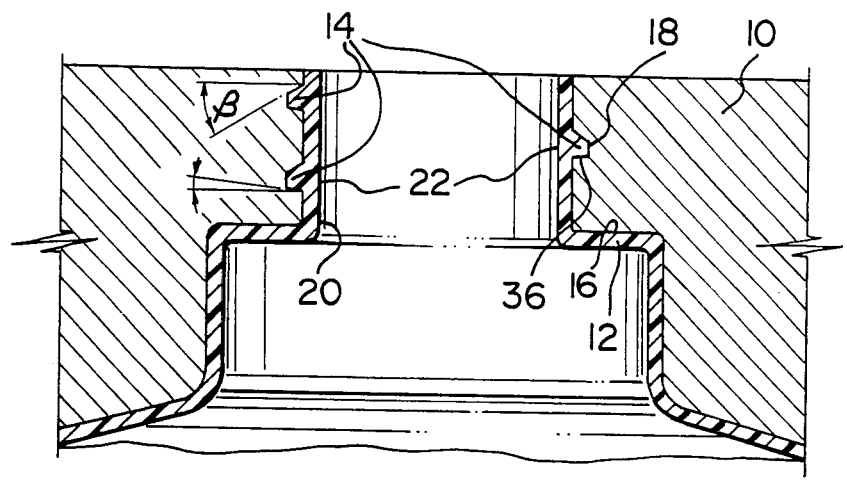
FIG. 1 illustrates the known manner of blow molding an external thread.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

With reference to FIG. 1, there is illustrated a sectional view of a mold 10 having therein a plastic container 12, the cylindrical top of which has been blow molded to form the external thread 14. It will be noted that the exterior configuration of the molded container conforms accurately to the mold at the outside edge 16 of the container. This applies as well to the outside edge of the thread 18.

Significantly, the interior surface 20 of the thermoplastic material does not conform to the pattern established by the mold on the outside of the material. Thus, at the inside surface 22 opposite to the external threads, there may be very little distortion of the smooth interior surface.

Where an internal thread is desired, it is this smooth interior surface which in fact must be molded to form the thread.

Figure 2:
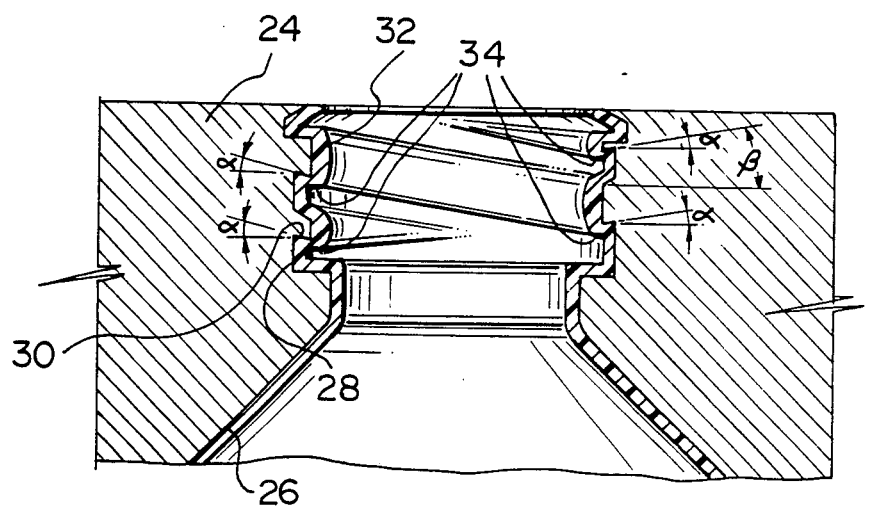
FIG. 2 illustrates the method and apparatus of the present invention.

Turning to FIG. 2, the critical importance of the above discussion is clearly illustrated. The drawing again illustrates in section a mold 24 and the upper portion of a thermoplastic article 26. Again the outer surface 28 of the molded article can be seen to conform accurately to the contours 30 of the mold. However, it is not the outside edge 28 of the molded material which is of importance, but rather, it is the inner surface 32 which defines the thread and so must be accurately formed.

If the mold is constructed in a manner similar to that of the FIG. 1 mold such that the mold contour is that desired for the finished internal thread, the outside surface 28 of the article will assume the shape of the contour, but the inside surface 32 will tend to damp out the contours in the same manner as the inside surface at 22 in FIG. 1. Because the profile of the inside thread of FIG. 2 is larger than that of the outside thread of FIG. 1, the plastic material will even on the inside surface 32, tend to move to some extent into the cavities.

In use, the outer side 34 of the continuous interior thread must bring up against and grip tightly the inner side 36 of the exterior thread. The gripping power must be sufficient to hold the two pieces in sealing engagement, and the profile of the internal thread is critical in this regard.

It is this difficulty in achieving a proper profile in the internal thread which has to date held up blow molding of such a component.

It has now been discovered that a suitable profile can be achieved by blow molding the thermoplastic material into a mold certain of the profiled surfaces of which are uniquely shaped to manipulate the flow characteristics to achieve the desired definition of the resulting interior thread. Specifically, the surface 30 of the mold 24 which lies on the outside of the thread opposite to the side 34; that is, the gripping side of the thread, is constructed at a negative angle relative to the path of the profile of the thread. This surface 30 may be said to define in the finished product the gripping surface (i.e. side 34) of the thread. This angle α is illustrated in FIG. 2. Clearly that angle is unusual in the context of FIGS. 1 and 2, since in all other cases the angles are in the opposite positive sense. In none of these other cases is the mold profile presented to the plastic material less than 90 degrees. The angle is taken relative to planes perpendicular to the axis of the mold.

It has been found that the proper choice of this negative angle will effect the damping of the mold profile at the inner surface 32 of the molded object. The mold profile can thus be constructed to result in the surface 34 of the interior thread assuming the necessary flat configuration to cooperate with the surface 36 of the exterior thread of FIG. 1. The angle choice must be at least 5 degrees. The preferred range is 5 to 15 degrees and the most preferred angle is 10 degrees.

By this means the flow characteristics of the thermoplastic material can be manipulated to achieve the desired profile.

The properties of the thermoplastic material also effect the performance of the product. Thus, it has been found preferable to use a lower density polyethylene as starting material. Sealing as between the spout and the container is enhanced by the higher coefficient of friction that is a characteristic of the lower density polyethylene.

From the manufacturing point of view, all of the negative angles, the flow characteristics of the material and the density of the material are of importance. If the negative angle is too small, clearly the internal thread profile will not be attained. On the other hand, as the angle increases beyond the preferred range, it becomes increasingly difficult to remove the finished product from the mold. In order that the production facility operate efficiently, it is necessary that the product drop freely from the mold as soon as the mold is opened without the intervention of a mold operator.

The hardness of the plastic is important from the user point of view. Generally speaking, the harder the plastic, the lower the coefficient of friction of the material. Therefore, if an internal thread such as that of FIG. 2 is blown with a high density plastic, and the thread is to be applied to an external thread such as that of FIG. 1, if the external thread is also of harder material, the frictional engagement between the two threads will not have sufficient holding power to maintain the thread tightly in position. For that reason it has been found preferable where the internal profile is to form an internal thread that the material used be a soft plastic. The preferred material will have a Shore hardness durometer reading of A70-85.

An additional consideration from the manufacturing and use point of view relates to thread size. It is desirable that thread size be kept reasonably tight to avoid an accordian-like stretching action. Generally, industry standards will dictate limits on thread size. For example, currently the standard thread size for four liter jugs and the like is 38 millimeters.

In terms of performance, the negative angle will lead to an increased gripping power between the internal thread and the external thread to which it is attached. Compression on the primary sealing ring will force the negative angled edge up against the right angle or positive angle of the bottle thread to thereby increase gripping and sealing efficiency.

Thus it is apparent that there has been provided in accordance with the invention blow molding of thermoplastic materials that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention:

1. A method of forming an internal thread on a blow-molded article, said method comprising the steps of
providing a mold having an internal surface disposed about a central axis and profiled surfaces in a part of the internal surface with one of said profiled surfaces disposed on a negative angle of 5° to 15° to a plane perpendicular to said central axis; and blow molding a thermoplastic material within the mold to cause the material to flow into and conform at an outer surface thereof with said profiled surfaces while forming an internal surface having a damped configuration, including an internal thread having a flat gripping surface opposite said one profiled surface sufficient for threadably gripping and sealing with an external thread on a container.

2. A method of forming an internal thread in a cylindrical thermoplastic material for threadably engaging with an external thread on a container, said method comprising the steps of providing a mold having profiled surfaces to define a finished internal thread, one of said profiled surfaces having a negative angle of 5 to 15 degrees relative to the path of the profile of the thread; and blow molding a thermoplastic material into the profiled surfaces to cause the material to flow into and conform at an internal surface thereof with said profiled surfaces while forming an internal surface having a damped configuration, including an internal thread within the material having a flat gripping surface opposite said one profiled surface sufficient to threadably grip and seal with an external thread on a container.

3. The method of claim 1 in which said thermoplastic material has a Shore hardness of A70-85.

4. The method of claim 1 wherein said angle is 10 degrees.

* * * * *

UNITED STATES PATENT AND TRADEMARK OFFICE
CERTIFICATE OF CORRECTION

PATENT NO. : 4,755,342

DATED : July 5, 1988

INVENTOR(S) : PAUL J. BIERMAN

It is certified that error appears in the above-identified patent and that said Letters Patent is hereby corrected as shown below:

```
Column 2, line 1  "require" should be -need-
Column 3, line 44 "mold certain" should be -mold,certain-
Column 3, line 61 "effect" should be -affect-
Column 4, line 5  "effect" should be -affect-
Column 6, line 5  "internal" should be -outer-
```

Signed and Sealed this

Twenty-first Day of March, 1989

Attest:

DONALD J. QUIGG

Attesting Officer

Commissioner of Patents and Trademarks